United States Patent
Lenz et al.

(12) 
(10) Patent No.: US 6,512,594 B1
(45) Date of Patent: Jan. 28, 2003

(54) PRINTER OR LAMINATOR WITH MULTI-THREADED PROGRAM ARCHITECTURE

(75) Inventors: Gary A. Lenz, Eden Prairie, MN (US); Robert J. Innes, Savage, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/477,970

(22) Filed: Jan. 5, 2000

(51) Int. Cl.⁷ ............................................. G06F 13/00
(52) U.S. Cl. ..................... 358/1.16; 358/1.17; 711/100; 711/132
(58) Field of Search ........................... 358/1.1, 1.5, 1.9, 358/1.12, 1.13, 1.14, 1.15, 1.16, 1.17; 709/100, 103, 107, 108; 710/6, 7; 711/100, 132

(56) References Cited

U.S. PATENT DOCUMENTS

| | | | |
|---|---|---|---|
| 5,413,532 A | 5/1995 | Raby | 462/2 |
| 5,637,174 A | 6/1997 | Field et al. | 156/256 |
| 5,727,137 A | 3/1998 | LeClair et al. | 375/116 |
| 5,758,184 A * | 5/1998 | Lucovsky et al. | 710/6 |
| 5,771,058 A | 6/1998 | Kobayashi | 347/218 |
| 5,771,382 A * | 6/1998 | Wang et al. | 709/100 |

\* cited by examiner

*Primary Examiner*—Mark Wallerson
(74) *Attorney, Agent, or Firm*—Westman, Champlin & Kelly

(57) ABSTRACT

A printer for printing on a substrate includes an input configured to receive data, a print mechanism configured to print an image on the substrate, and a controller coupled to the input and the print mechanism configured to actuate the print mechanism in response to the input. The controller includes a microprocessor and memory containing a multi-threaded operating system and programming instructions for the microprocessor. The memory implements a plurality of stacks, each stack related to a thread. The programming instructions include a plurality of separate programs and the operating system executes each program as a separate thread and stores information related to each thread on a respective stack in the memory.

30 Claims, 3 Drawing Sheets

PRINTER OR LAMINATOR WITH MULTI-THREADED PROGRAM ARCHITECTURE

BACKGROUND OF THE INVENTION

The present invention relates to printers or laminators such as those used to print or laminate identification cards. More specifically, the invention relates to operation of a controller used in controlling such printers.

Printers are used for recording images onto a substrate. One type of printer is an identification card printer used for printing onto plastic identification cards.

Plastic ID card printers are used in applications where plastic cards may be constructed, printed, laminated, encoded and cut to size. Driver's licenses for countries and states are often manufactured with a plastic ID card printer. There are many places which require the use of personal ID cards for security and financial transactions. One type of plastic ID card printer uses blank pre-cut cards which are fed into a printer for encoding of data media on the card, printing of an image or text, lamination of one or both sides and for validation of the encoded data. Another type of plastic ID card printer use a card which is constructed from three web based materials which are melted together with an image printed on the inside of one of the layers, and the web is cut to size. This is illustrated, for example, in U.S. Pat. No. 5,413,532.

Plastic ID card printers are frequently used for preparing high volumes of cards in a short period of time. A common example of this type of application is the issuance of driver's licenses where a queue of people have their photo taken, the photos are rasterized and used for printing and driver's licenses constructed while the subjects wait. Such card printers used for the production of driver's licenses are typically limited in their production capacity to about 90 cards/hour.

It is also common for printing bureaus to use plastic ID card printers for production of large volumes of cards in a short period of time. These types of plastic ID card printers are typically capable of printing single sided three color cards at a rate of about 180 cards/hour.

In both of the above applications, there is a high throughput of cards from a single printer. Service bureau's may choose to invest in multiple printers which can be spooled to provide for larger volumes of cards. However, multiple card printers for the issuance of driver's licenses may reduce the length of the queue but not the waiting time.

ID card printers and multi-web driver's license printers are throughput performance limited. The performance limits are ultimately established by the thermodynamic process time constants of dye diffusion from thermal printing, time-temperature time constants from laminating and material transporting. Further, today's printers are critically performance limited by the design of the microcontrollers' software structure that is used for operating and controlling the printer actuation devices and control loops.

The embedded CPU in the printers are severely taxed by computationally intensive processes such as print head control. Most printers give priority to the printing process and attempt to execute other processes during idle time. As a consequence of this "round robin" or interrupt driven tasking, many of the process steps required to make a card are executed serially. The result is a slow card production process.

SUMMARY OF THE INVENTION

A printer or laminator for printing or laminating on a substrate includes an input configured to receive data, a print mechanism configured to print an image on the substrate, and a controller coupled to the input and the print mechanism configured to actuate the print mechanism in response to the input. The controller includes a microprocessor and memory containing a multi-threaded operating system and programming instructions for the microprocessor. The memory implements a plurality of stacks, each stack related to a thread. The programming instructions include a plurality of separate programs and the operating system executes some programs as separate threads and stores information related to each thread on a respective stack in the memory.

DETAILED DESCRIPTION OF THE ILLUSTRATIVE EMBODIMENTS

Figure 1:
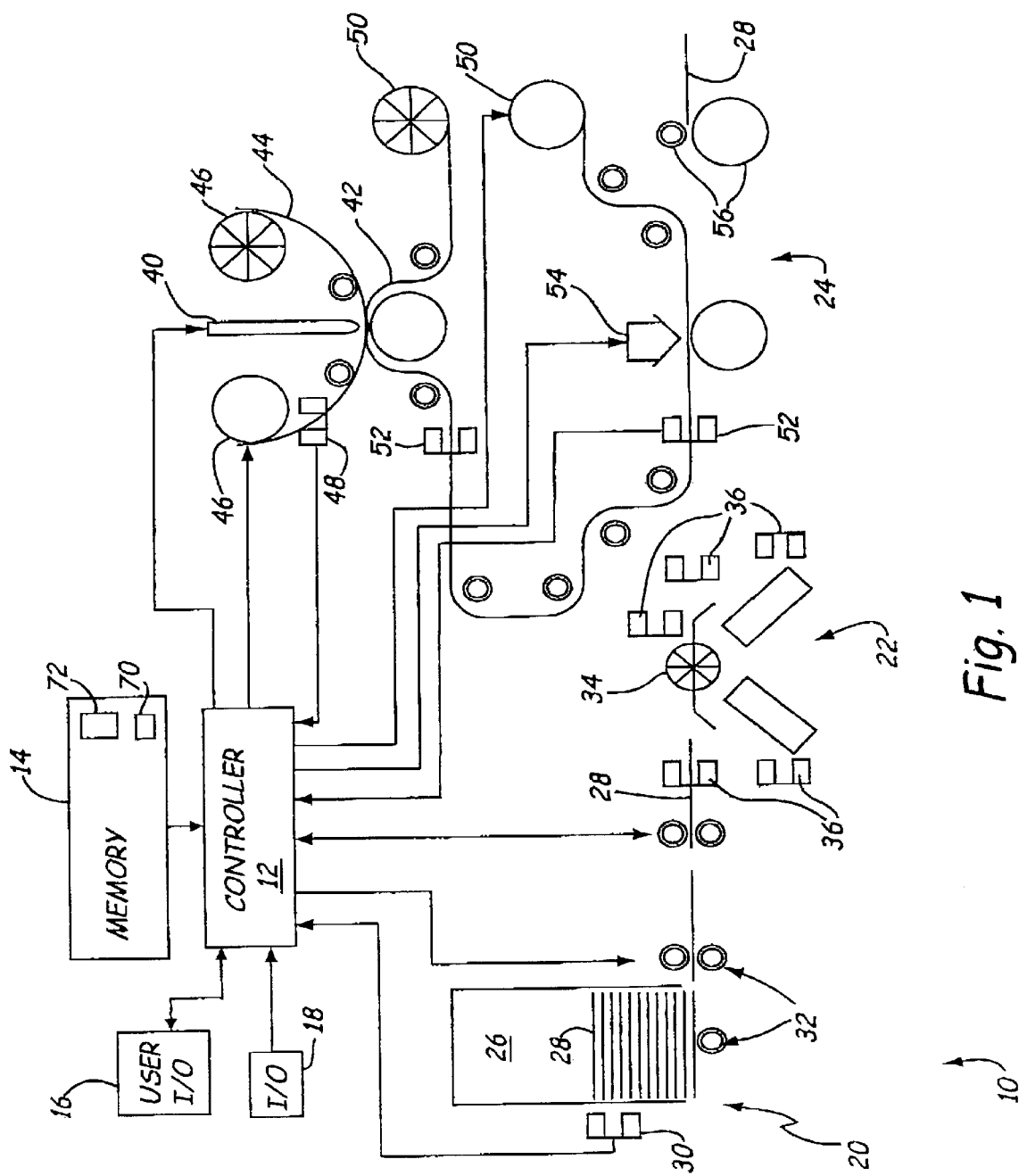
FIG. 1 is a simplified block diagram showing an identification card printer implementing a multi-threaded architecture in accordance with the present invention.

FIG. 1 is a simplified block diagram of a printer 10 which implements a multi-threaded architecture in accordance with the present invention using controller 12 which operates in accordance with instructions stored in memory 14. Controller 12 can comprise a microprocessor for example, such as an MPC823 and memory 14 can comprise both volatile and nonvolatile memory, some of which may actually be a part of the controller 12 or which may be completely separate from controller 12. Memory 14 is used to store both programming instructions, printer related parameters, and temporary variables used during processing.

Controller 12 couples to various components of printer 10 such as a user input/output 16, a data input/output 18, a card feeder mechanism 20, a card encoding mechanism 22 and a card printer mechanism 24. Feeder mechanism 20 includes a hopper 26 for carrying a plurality of identification cards 28 and a sensor 30 for sensing the contents of hopper 26. Rollers 32 can be actuated by controller 12 to move an identification print 28 into encoding mechanism 22. Encoding mechanism 22 includes a flipping mechanism 34 which used to move a card 28 between various encoders/sensors 36. These can be used, for example to record or readback magnetically encoded information or smart card data on card 28. Printing mechanism 24 is configured to use a reverse image printing technique in which a print head 40 transfers a reverse image onto a web 42 using dye from a ribbon 44. Other aspects include use with direct card printing and ink jet techniques. Ribbon 44 moves between reels 46 and its position is sensed by controller 12 using a sensor 48. Web 42 moves between reels 50 onto the control of controller 48 which senses the position of web 50 using sensors 52. The reverse image is transferred to a card 28 using transfer press 54 and the card 28 is ejected from printer 10 by output rollers 56.

Although the block diagram of FIG. 1 is greatly simplified, it does illustrate the complexity of printer 10 and the number of tasks which must be controlled by controller 12. These tasks include the operation of the feeder mechanism 20, encoding mechanism 22 and printing mechanism 24. The image must be transferred onto web 42 using print head 40 and this itself may involve complex control algorithms for controlling the elements of print head 40. Further, the various data encoding and decoding performed using encoding mechanism 42 must be performed by controller 12.

The controller 12 of the present invention implements a multi-threaded architecture. This architecture allows the present invention to increase the throughput and processing efficiency of controller 12 such that it may sufficiently control all or some of the various components in printer 10. A multi-threaded architecture is different than a multi-processor architecture in which various processors are used to control the printing. A multi-threaded architecture is implemented using a multi-threaded operating system which permits the concurrent execution of multiple applications with a single operation system, on a single CPU while delivery exactly the CPU performance required by each application.

A "thread" is a sequence of program steps executing within a process. A thread keeps track of its location in the process using a Program Counter (PC) 70 and a stack 72 containing return address and local variables. A typical prior art printer maintains only a single thread of control. While there may be many different routes through the programming code in such prior art processors, only one such route will be active at any given time. Multi-threaded architecture extends this functionality to allow many threads to be active at the same time. Each thread runs independently of the other thread (i.e., has its own virtual kernel and stack). The various threads share the same code and many of the same variables, but each thread controls its own execution. The various threads can be running the same section of code or they can be running completely different sections of code independently.

The multi-threaded architecture of the present invention offers a number of advantages over prior art printers. Traditional single-threaded applications suffer when the program structure requires concurrent execution. For example, if a particular module in the printer must answer multiple requests simultaneously, a single threaded architecture can only answer one request at a time. The other requests are queued until the current request has been satisfied. If answering the current request is a relatively slow process, all subsequent requests are blocked until the present request is satisfied. In contrast, in a printer with a multi-threaded architecture of the invention, each request can invoke a new thread which is responsible for addressing the needs of only that one request. Even if one request takes a relatively long time to be satisfied, the other thread can continue to operate, thereby answering the other requests. This increases the throughput of the processor and reduces the latenacy of shorter tasks. Another example of a shortcoming of a single-threaded process is when the process must respond to user input while performing other processing. A typical single-threaded program usually has to interrupt a processing task at regular intervals and check for user input and, if any exists, respond to the input. In a multi-threaded program, the separate tasks can be performed by separate threads.

Another programming technique uses multiple processors to achieve a result similar to a multi-threaded process. This is shown, for example, in co-pending application Ser. No. 60/133,003, filed May 7, 1999 and entitle "PRINTER WITH DISTRIBUTED COMPUTER MODULE ARCHITECTURE" which is assigned to the present assignee and is incorporated herein by reference. For example, when a program receives a request that requires it to respond, it can fork to a new application which does the additional processing. This achieves much of the same functionality of a multi-threaded application. However, this technique suffers from inefficiency and complexity. To process the request using a multi-threaded architecture, the processor only needs to create a new thread. In contrast, the single-threaded technique requires the processor to fork to a new application. Under a multi-threaded operated system, a thread can typically be created 30 times faster than a new application.

Data can also be shared more easily between threads than between applications. A thread can access most data within the process so that a change made by one thread can be used by other threads. In contrast, different applications cannot share data this easily. Some interprocess communication mechanism is required such as shared memory to achieve this functionality.

Typical multi-threaded kernel services include task management, synchronization, interrupt management, alarms and error management. Task management involves the activation and termination of tasks, management of task states and switching between tasks. Synchronization involves resource management for accessing shared resources or devices and event control such as event management for task synchronization. The interrupt management provides services for processing interrupts. The alarms provided by the kernel services include relative and absolute alarms such as static alarms which are defined when the program is compiled and dynamic alarms which are defined while the program is running. Error management includes mechanisms for supporting the user in case an error occurs.

With the present invention, the functionality of a multi-threaded embedded operating system and architecture are provided to a printer, and specifically an identification card printer. The present invention can be implemented using a single CPU, or with multiple distributed CPUs. Note that a multi-threaded system is different than a multi-tasking system. In general, a task can be compared to a contained that holds various objects and global variables that define the task. The task can also contain multiple threads. A thread is an executable piece of code that contains a copy of the task's environment. Multi-tasking is the ability of an operating system to create and control more than one task. This is usually accomplished by a time slicing mechanism. Multi-threading, in contrast, is the ability of a task to create and control more than one thread per task. The thread is a piece of code, or a function, that runs to completion. The completion state is defined by the programmer and, for some tasks, never completes. A thread can be dependent upon the task it is associated with in such a way that when the task completes, the thread will be completed.

In non-threaded architecture, there is a single stream of instructions that is in control of the application at any given time. In a multi-threaded process, the process starts out with one stream of instructions and can later create other instruction streams, called "threads", to do various tasks. This is similar to the programming technique known as "forking" another process. However, a fork creates a higher arcial relationship in which there is a parent application and a child application. In contrast, with multiple threads, all of the various threads are peers. Further, threads within a process share the same address space. In contrast, a forked process uses an entirely different address space than its parent and must use special operating system facilities such as pipes and shared memory to communicate with the parent or with other children.

In a multi-threaded process, each thread is associated with a kernel thread. The kernel thread is managed by the scheduler and handles all of the kernel requirements of the thread. A multi-threaded process shares most data between threads, except that each thread has its own copy of registered data. This allows data to be passed between threads via global barriers.

Creation and processing of individual threads is controlled by a thread scheduler. Each thread has its own priority and can even have it own scheduling algorithm. One scheduling technique is a simple round bobbin mechanism in which the thread is time sliced at a fixed priority. Another scheduling technique is a non-preempted technique in which a thread will run on the processor until it relinquishes process control. Yet another scheduling technique simply lowers a threads priority with increase CPU usage. This can be used for a load balancing technique.

Preferably, the invention is implemented in a 16 or 32-bit microcontroller with an embedded kernel or operating system. The printer application software for driving devices in the printer such as motors, stackers, encoders, laminators, clutches, heaters, punches, cutting devices, head printing, etc. are also embedded in the microcontroller or in associated memory. Preferably, the controller operates in accordance with a multi-threaded operating system such as RTOS from Wind River, QNX, Microsoft CE, RTXC, PSOS, Nucleus (preferred kernel) embedded NT, or others. These kernels or operating systems will provide for a multi-tasking and multi-threaded operation of the printer applications. With such an implementation, a single microcontroller which implements a multi-threaded architecture can provide better performance than multiple separate controllers.

Figure 2:
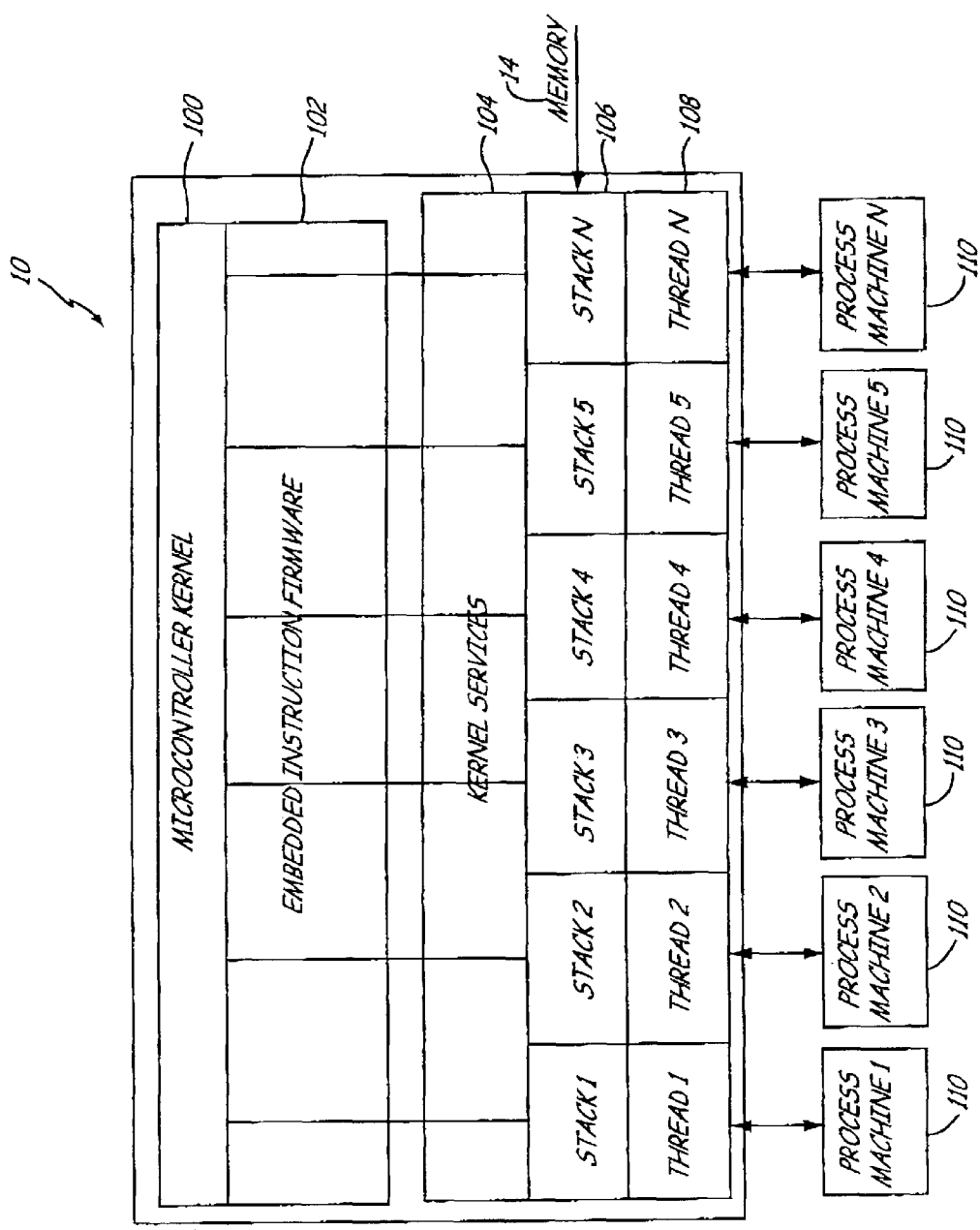
FIG. 2 is a simplified logical diagram showing the multi-threaded architecture implemented in the printer of FIG. 1.

In general, various threads in the controller 12 will be responsible for card feeding, card printing, lamination, card flipping, data encoding (i.e., writing magnetically encoded information on the card), and card transport. Other examples include a smart card encoder, an input card feeder, an output card stacker, a communication stack such as used for TCP/IP communication of a web server or for communication HTML or XML from an embedded web page. Each of these elements can be controlled by separate threads. FIG. 2 is a simplified logical diagram of printer 10 which shows microcontroller kernel 100 and embedded instruction firmware 102. Memory 14 implements kernel services 104 and stacks 106 (1–N), and threads 108 (1–N) for each respective thread. The threads are shown as implementing virtual process machines 110, each representing a particular physical process function. For example, process machine 1 can be for card feeding, process machine 2 can be for card printer, process machine 3 can be for card lamination, etc.

In general, the process of printing an identification card is composed of a series of steps. Some of these steps are particularly well suited for implementation in a multi-threaded environment. For example, one thread could be the process of programming the chip contained in a "smart card." While this is being done, another thread could be loading a card from the hopper and printing information onto the card. Further, yet another thread could be controlling the lamination of the card. Through the use of three threads, this process could be approximately three times faster than attempting to use a single application to linearly process a single card. The thread can be invoked using sensors attached to the printer which could also provide information that has to be positioned of the card.

The communication between the printer and a exterior device such as a PC is also well suited for multi-threaded tasks. For example, one thread can gather information related to the creation of a card while the printer was creating a card as set forth above. One low priority thread can be used to gather information to generation a status system while another thread is used to read the subsystem and generate data to be sent to the external device reporting on the printer status. Another thread can be used to configure the printer.

Figure 3:
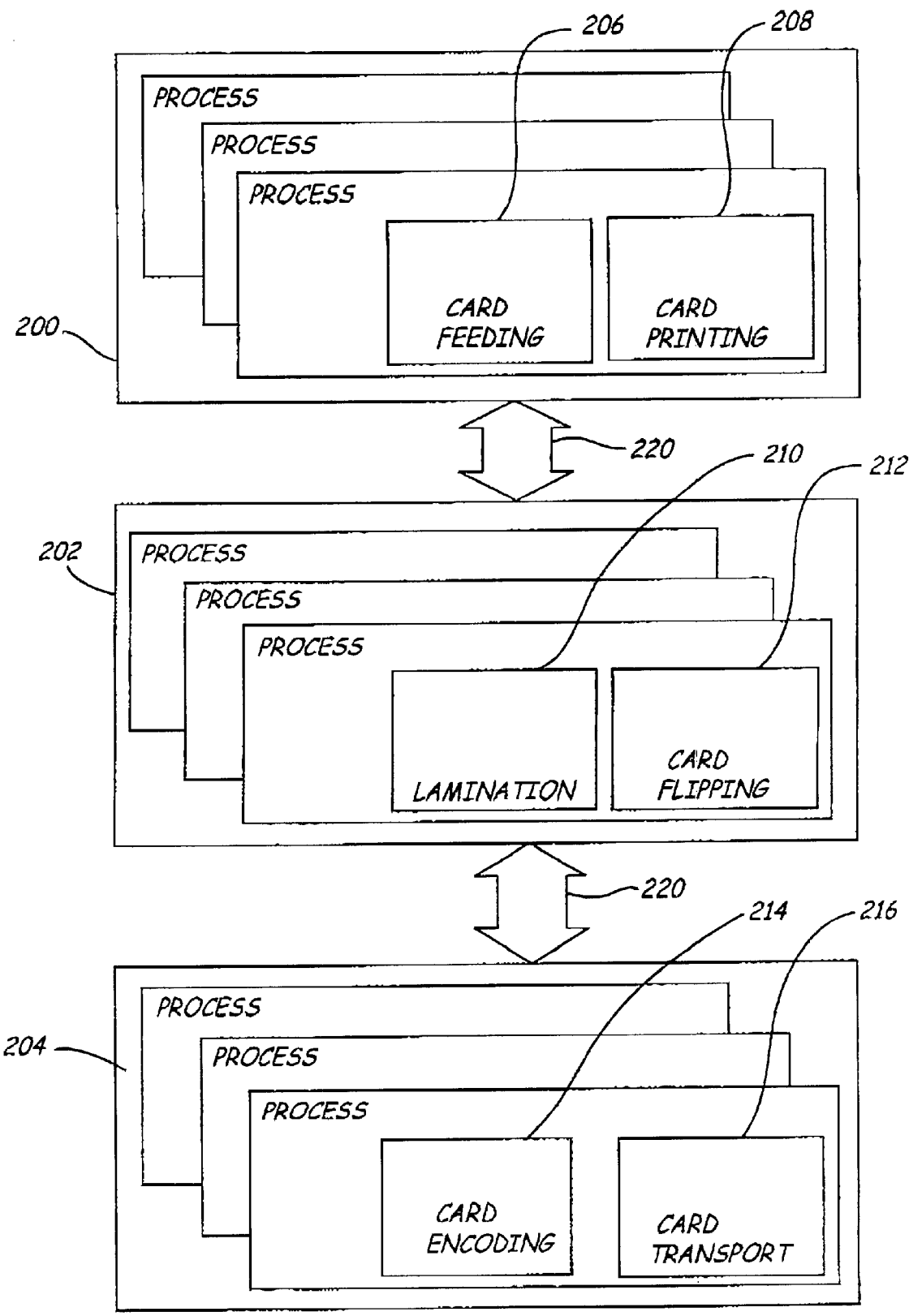
FIG. 3 is a simplified logical diagram showing another embodiment of the present invention in which multiple controllers implement multi-threaded architecture in the printer of FIG. 1.

FIG. 3 is a logical diagram showing another embodiment of printer 10. In the embodiment of FIG. 3, multiple controllers, 200, 202 and 204 are shown each implementing a multi-threaded architecture. Controller 200 implements thread 206 for card feeding and thread 208 for card printing. Controller 202 implements thread 210 for card lamination and thread 212 for card repositioning or "flipping". Controller 204 provides a card encoding thread 214 and a card transport thread 216. Controllers 200, 202 and 204 communicate using a bus 220 and are capable of sharing information between with other controllers. This architecture allows printer 10 to be optimized for processing cards without waiting for CPU availability and without bandwidth limitations on bus 220.

With the present invention, the various tasks in a printer can be performed without having to stop the printing process periodically, poll for interrupts, service those interrupts and then restart the printing process. Further, the printer does not need to wait for a particular process to be completed before accepting an interrupt. With the multi-threaded architecture, the various tasks can be delegated to different threads. The lamination thread and the printing thread can run in a virtual parallel mode until each process is complete.

Furthermore in a multi-threaded architecture, each thread has access to the allocated resources within the process and can access global variables which are available to all threads stored in memory 14. In multi-threaded processor software architecture "believes" it has independent access to its own "virtual machine" with a scheduler being responsible for allocation of CPU time to the various threads in a manner selected to optimize efficiency. Further, it is possible for threads within a task to share resources such as application filed pointers and code segments. Swapping between threads within a process presents much less overhead than swapping between entire programs.

Although the present invention has been described with reference to preferred embodiments, workers skilled in the art will recognize that changes may be made in form and detail without departing from the spirit and scope of the invention. For example, the elements described herein can be implemented in either software, hardware or their combinations and are not limited to the particular embodiments set forth. As will be apparent to those skilled in the art, the controller architecture can be implemented as a single physical unit or distributed over multiple physical elements as desired. Further, multiple controllers can be used, with at least one implementing a multi-threaded architecture in accordance with the invention. The multi-threaded architecture of the present invention can also be implemented using a multiprocessor environment or in a parallel processor configuration. The invention can be used in printers, laminators or their combination. For example, element 10 can comprise a laminator. In another aspect, one of process machines 110 can comprise a radio frequency identification (RFID) tag communicator used to communicate with an RFID on a card. In another aspect, the memory can contain a web page which can be served using a separate server program. Further, an XML parser for parsing a communicated data packet and wherein one of the plurality of programs contains the operation of the XML parser. Further still, a plurality of web based materials with a plurality of a takeup spools of supply spools can be provided.

What is claimed is:

1. A printer for printing on a substrate, comprising:
   an input configured to receive data;
   a print mechanism configured to print an image on the substrate;
   a controller coupled to the input and the print mechanism configured to actuate the print mechanism in response to the input, the controller including:
      a microprocessor; and
      memory containing a multi-threaded operating system and programming instructions for the microprocessor, the memory further implementing a plurality of stacks, each stack related to a thread;
   wherein the programming instructions include at least two separate programs and the operating system executes each program as a separate thread and stores information related to each thread on a respective stack in the memory.

2. The printer of claim 1 wherein one of the plurality of programs controls operation of the print mechanism.

3. The printer of claim 1 wherein one of the plurality of programs controls the receipt of data through the input.

4. The printer of claim 1 wherein one of the plurality of programs controls movement of the substrate through the printer.

5. The printer of claim 1 including a laminator and wherein one of the plurality of program controls lamination of the substrate by the laminator.

6. The printer of claim 1 including a plurality of microprocessors implemented a multi-threaded operation system.

7. The printer of claim 1 wherein the controller implements a multi-threaded operating system.

8. The controller of claim 7 wherein the operating system comprises a kernel with a multi-threaded threaded instruction set.

9. The printer of claim 1 including an output and wherein one of the plurality of programs controls transmission of data through the output.

10. The printer of claim 1 wherein the one of the plurality of programs performs diagnostics on the printer components.

11. The printer of claim 1 wherein data stored in the memory is shared between at least two of the plurality of programs.

12. The printer of claim 1 wherein each thread is assigned a priority and the controller operates on each thread in accordance with its priority.

13. The printer of claim 1 including a sensor and wherein an output from the sensor invokes one of the plurality of programs.

14. The printer of claim 1 wherein each stack stores register data unique to each of the plurality of separate programs.

15. The printer of claim 1 including a card flipping mechanism and wherein one of the plurality of separate programs controls operation of the card flipping mechanism.

16. The printer of claim 1 including a web which moves between a take-up spool and a supply spool and wherein one of the plurality of separate programs controls movement of the web.

17. The printer of claim 1 wherein one of the plurality of programs controls data sent to the print mechanism to thereby provide the image.

18. The printer of claim 1 including a magnetic encoding mechanism and wherein one of the plurality of separate programs controls operation of the magnetic encoding mechanism.

19. The printer of claim 1 including a smart card encoding mechanism and wherein one of the plurality of separate programs controls operation of the smart card encoding mechanism.

20. The printer of claim 19 including an encoder for a proximity card and wherein one of the plurality of separate programs controls operation of the encoder.

21. The printer of claim 1 including an encoder for a proximity card and wherein one of the plurality of separate programs controls operation of the encoder.

22. The printer of claim 1 including an input card feeder mechanism and wherein one of the plurality of separate programs controls operation of the input card feeder mechanism.

23. The printer of claim 1 including an output card stacker mechanism and wherein one of the plurality of separate programs controls operation of the output card stacker mechanism.

24. The printer of claim 1 including a communication stack for communicating with external devices and wherein one of the plurality of separate programs controls the communication stack.

25. The printer of claim 24 wherein the communication stack comprises a TCP/IP communication stack.

26. The printer of claim 1 including a web server for delivering data and wherein one of the plurality of separate programs controls operation of the web server.

27. The printer of claim 1 including an XML parser for parsing a communicated data packet and wherein one of the plurality of programs controls the operation of the XML parser.

28. The printer of claim 16 with a plurality of web based materials with a plurality of takeup spools of supply spools.

29. The printer of claim 1 including a supply with an RFID tag, a read/write coil and circuit and wherein one of the plurality of separate programs contains the reading and writing of data to the RFID tag.

30. A laminator for laminating on a substrate, comprising:
   an input configured to receive data;
   a laminating mechanism configured to laminate on the substrate;
   a controller coupled to the input and the laminating mechanism configured to actuate the laminating mechanism in response to the input, the controller including:
      a microprocessor; and
      memory containing a multi-threaded operating system and programming instructions for the microprocessor, the memory further implementing a plurality of stacks, each stack related to a thread;
   wherein the programming instructions include at least two separate programs and the operating system executes each program as a separate thread and stores information related to each thread on a respective stack in the memory.

* * * * *